(12) United States Patent
Li et al.

(10) Patent No.: US 11,540,259 B2
(45) Date of Patent: Dec. 27, 2022

(54) RESOURCE DETERMINING METHOD AND APPARATUS

(71) Applicant: HUAWEI TECHNOLOGIES CO., LTD., Guangdong (CN)

(72) Inventors: Xueru Li, Beijing (CN); Ruiqi Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 203 days.

(21) Appl. No.: 16/992,779

(22) Filed: Aug. 13, 2020

(65) Prior Publication Data
US 2020/0374869 A1 Nov. 26, 2020

Related U.S. Application Data

(63) Continuation of application No. PCT/CN2019/074860, filed on Feb. 12, 2019.

(30) Foreign Application Priority Data

Feb. 14, 2018 (CN) .......................... 201810152099.5

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1861* (2013.01); *H04L 5/0055* (2013.01); *H04W 72/044* (2013.01)

(58) Field of Classification Search
CPC ............ H04W 72/0413; H04W 72/044; H04L 1/1861; H04L 5/0055
See application file for complete search history.

(56) References Cited

U.S. PATENT DOCUMENTS

| 11,153,126 B2 * | 10/2021 | He .................... H04L 5/1469 |
| 2014/0269452 A1 * | 9/2014 | Papasakellariou .... H04L 1/1854 |
| | | 370/280 |

(Continued)

FOREIGN PATENT DOCUMENTS

| CN | 102123008 A | 7/2011 |
| CN | 103384188 A | 11/2013 |
| CN | 104284424 A | 1/2015 |
| CN | 107241802 A | 10/2017 |

OTHER PUBLICATIONS

Ericsson, "On UE Behavior for UCI Reporting and Other Issues," 3GPP TSG RAN WG1 Meeting AH 1801, R1-1800947, Vancouver, Canada, Jan. 22-26, 2018, 18 pages.

(Continued)

*Primary Examiner* — Michael J Moore, Jr.
(74) *Attorney, Agent, or Firm* — Fish & Richardson P.C.

(57) ABSTRACT

One example method includes determining, by a terminal device, that at least two physical uplink control channel (PUCCH) resources collide in a time unit n, where n is an integer, and the at least two PUCCH resources include a first resource configured for first uplink control information (UCI) and a second resource configured for second UCI; and determining, by the terminal device, the first resource and a third resource in the time unit n, where the third resource is one of M PUCCH resources, the first resource and the third resource do not include a same orthogonal frequency division multiplexing (OFDM) symbol in time domain, and M is a positive integer greater than or equal to 1, and the first resource is used to carry a part or all of the first UCI, and the third resource is used to carry a part or all of the second UCI.

20 Claims, 5 Drawing Sheets

(56) References Cited

U.S. PATENT DOCUMENTS

| | | | | |
|---|---|---|---|---|
| 2016/0094996 | A1* | 3/2016 | Xiong | H04W 72/0446 |
| | | | | 370/329 |
| 2017/0041923 | A1* | 2/2017 | Park | H04L 1/1671 |
| 2018/0132264 | A1* | 5/2018 | Jung | H04L 1/1864 |
| 2018/0294938 | A1* | 10/2018 | Munier | H04L 5/0012 |
| 2018/0375619 | A1* | 12/2018 | Hwang | H04L 5/0055 |
| 2019/0081763 | A1* | 3/2019 | Akkarakaran | H04L 1/1607 |
| 2019/0132861 | A1* | 5/2019 | Koorapaty | H04W 76/27 |
| 2020/0044803 | A1* | 2/2020 | Li | H04B 7/0626 |
| 2020/0153541 | A1* | 5/2020 | Faxér | H04L 1/1854 |
| 2020/0236670 | A1* | 7/2020 | Xiong | H04L 1/1812 |
| 2020/0359403 | A1* | 11/2020 | Lee | H04W 72/0406 |
| 2020/0367244 | A1* | 11/2020 | Yang | H04L 5/0091 |
| 2020/0374869 | A1* | 11/2020 | Li | H04L 1/00 |
| 2020/0403758 | A1* | 12/2020 | Song | H04L 1/00 |

OTHER PUBLICATIONS

Extended European Search Report issued in European Application No. 19754614.6 dated Feb. 23, 2021, 9 pages.
Oppo, "Summary of email discussion [90b-NR-29] on PUCCH resource set," 3GPP TSG RAN WG1 Meeting 91, R1-1719972, Reno, USA, Nov. 27-Dec. 1, 2017, 14 pages.
Office Action issued in Chinese Application No. 201810152099.5 dated Mar. 29, 2021, 7 pages.
PCT International Search Report and Written Opinion in International Application No. PCT/CN2019/074,860, dated Apr. 24, 2019, 15 pages (with English Translation).
Vivo,"On PUCCH Resource Allocation",3GPP TSG RAN WG1 Meeting 91, R1-1719792, Dec. 1, 2017, 6 pages.
Zte et al,"NR PUCCH Resource Allocation",3GPP TSG RAN WG1 Meeting 91, R1-1719677, Dec. 1, 2017, 10 pages.

* cited by examiner

RESOURCE DETERMINING METHOD AND APPARATUS

CROSS-REFERENCE TO RELATED APPLICATIONS

This application is a continuation of International Application No. PCT/CN2019/074860, filed on Feb. 12, 2019, which claims priority to Chinese Patent Application No. 201810152099.5, filed on Feb. 14, 2018. The disclosures of the aforementioned applications are hereby incorporated by reference in their entireties.

TECHNOLOGY

Embodiments of the present invention relate to the communications field, and more specifically, to a resource determining method and apparatus.

BACKGROUND

A long-term evolution (LTE) system uses a precoding technology to improve signal transmission quality or a signal transmission rate. In a frequency division duplex (FDD) system, a precoding matrix may be obtained based on channel state information (CSI) fed back by a terminal device. The CSI includes one or more of a rank indication (RI), a precoding matrix indication (PMI), a channel quality indicator (CQI), a channel state information-reference signal resource indicator (CRI), and a reference signal received power (RSRP). Data transmission efficiency and reliability can be improved by using accurate CSI.

In a next-generation wireless communications system, an access network device may configure CSI reporting for a terminal device. The CSI reporting may be periodic, aperiodic, or semi-persistent. Periodic CSI reporting means that CSI is reported at a corresponding moment based on a period and a time unit offset that are configured by the access network device. Semi-persistent CSI reporting means that after the access network device performs CSI reporting activation and before the access network device performs CSI reporting deactivation, CSI is reported at a corresponding moment based on a period and a time unit offset that are configured by the access network device. The period and the time unit offset may be calculated in slots. The periodic CSI reporting and the semi-persistent CSI reporting may be carried, for transmission, on a physical uplink control channel (PUCCH) resource preconfigured by the access network device for the terminal device. After the access network device configures PUCCH resources for each periodic CSI reporting (or semi-persistent CSI reporting) of the terminal device by using radio resource control (RRC) signaling, the CSI reporting is always sent by using the PUCCH resources, until the access network device reallocates, for the terminal device by using the RRC signaling, PUCCH resources used by the CSI. Each PUCCH channel occupies a specific time domain resource and a specific frequency domain resource. The access network device may configure, for one terminal device, a plurality of pieces of periodic CSI reporting and/or semi-persistent CSI reporting. Different periodic CSI reporting or semi-persistent CSI reporting may have different periods or time unit offsets. For example, in FIG. 1, the access network device configures two different pieces of periodic CSI reporting for the terminal device, for example, CSI 1 and CSI 2 in the figure. A reporting period of the CSI1 is T1, and a reporting period of the CSI 2 is T2.

In addition to periodic CSI, an answer feedback for downlink data scheduling is also carried on a PUCCH. In this specification, the answer feedback is also referred to as hybrid automatic repeat request-acknowledgment (HARQ-ACK) information, or referred to as positive acknowledgment or negative acknowledgment (ACK/NACK) information. The answer feedback includes an ACK or a NACK. The answer feedback is used to indicate the access network device whether data of specific downlink scheduling is correctly received by the access network device. If the terminal device feeds back an ACK it indicates that the data of the downlink scheduling is correctly received. If the terminal device feeds back a NACK, it indicates that the data of the downlink scheduling is not correctly received. The access network device may determine, based on the ACK/NACK fed back by the terminal device, whether a packet needs to be retransmitted. An answer mechanism is an important mechanism to ensure reliability of downlink data scheduling.

Different from periodic CSI, an ACK/NACK occupies a PUCCH resource that may be dynamically selected from a plurality of predefined or preconfigured PUCCH resources by using downlink control information (DCI). Specifically, the access network device configures N PUCCH resources for the terminal device by using RRC signaling, where N is a positive integer. When one piece of DCI schedules one physical downlink shared channel (PDSCH) for transmission, the DCI further indicates one resource from the N preconfigured PUCCH resources, to carry an ACKNACK that needs to be fed back for the PDSCH transmission.

By configuring a proper period and a proper time unit offset, a plurality of pieces of periodic CSI are usually not sent in a same slot.

However, at some moments, a plurality of pieces of periodic CSI and/or ACKs/NACKs still need to be sent in a same slot. When a plurality of PUCCH resources that carry the foregoing information collide, user equipment (UE) cannot directly send the foregoing information on a preconfigured resource or a resource indicated by DCI. Otherwise, transmission performance of the foregoing information is reduced. When the PUCCH resources occupy at least one same orthogonal frequency division multiplexing (OFDM) symbol, different PUCCH resources may collide. Therefore, a resource determining mechanism needs to be provided, to provide a feasible solution when PUCCH resources of a plurality of pieces of periodic CSI and/or ACK/NACK collide.

SUMMARY

Embodiments of the present invention provide a resource determining method and apparatus, so that a plurality of pieces of uplink control information (UCI) can be sent in a same time unit.

According to a first aspect, a resource determining method is provided. The method includes: determining that at least two PUCCH resources collide in a time unit n, where n is an integer, and the at least two PUCCH resources include a first resource configured for first UCI and a second resource configured for second UCI; and determining the first resource and a third resource in the time unit n, where the third resource is one of M PUCCH resources, the first resource and the third resource do not include a same OFDM symbol in time domain, M is a positive integer greater than or equal to 1, the first resource is used to carry a part or all of the first UCI, and the third resource is used to carry a part or all of the second UCI. That is, the first resource is used to carry third UCI, and the third UCI is a part or all of the first UCI, and the third resource is used to carry fourth UCI, and the fourth UCI is a part or all of the second UCI.

The foregoing steps may be performed by a network device or a chip in the network device, or may be performed by a terminal device or a chip in the terminal device.

According to a second aspect, a wireless apparatus is provided. The apparatus includes a processor and a memory coupled to the processor. The processor is configured to determine that at least two PUCCH resources collide in a time unit n, where n is an integer, and the at least two PUCCH resources include a first resource configured for first UCI and a second resource configured for second UCI. The processor is further configured to determine the first resource and a third resource in the time unit n, where the third resource is one of M PUCCH resources, the first resource and the third resource do not include a same OFDM symbol in time domain, M is a positive integer greater than or equal to 1, the first resource is used to carry third UCI, the third UCI is a part or all of the first UCI, the third resource is used to carry fourth UCI, and the fourth UCI is a part or all of the second UCI.

In the foregoing solution, when the at least two PUCCH resources collide, the first resource and the third resource in the time unit n are determined. The third resource and the first resource do not include the same OFDM symbol in time domain. To be specific, a part or all of the first resource used to carry the first UCI and a part or all of the third resource used to carry the second UCI are time division multiplexing (TDM). Therefore, the foregoing solution provides a possibility of sending a part or all of the first UCI and a part or all of the second UCI in a TDM manner. Further, because a part or all of the first UCI is still carried in the first resource configured for the first UCI, factors such as transmission reliability and a feedback delay of the UCI transmitted on the first resource may be prevented from being affected by collision of PUCCH resources.

In the foregoing solution, each PUCCH resource may be uniquely determined by one or more parameters. For example, one PUCCH resource may be uniquely determined by defining an index of an occupied OFDM symbol, an index of an occupied resource block (RB), a PUCCH format, and the like. It should be noted that a parameter used to uniquely determine one PUCCH resource may also include another parameter, for example, orthogonal cover code (OCC) and/or a maximum channel coding code rate.

The access network device may further configure one PUCCH resource for a terminal device by using higher layer signaling, for example, RRC signaling. Optionally, one or more of the foregoing parameters may be included in the higher layer signaling, to configure the PUCCH resource. "N PUCCH resources" herein correspond to configurations of the N PUCCH resources, and each configuration of the PUCCH resources includes all or a part of the foregoing parameters. The foregoing parameters corresponding to different configurations of the PUCCH resources may be partially or completely different.

Optionally, all or a part of the first UCI and all or a part of the second UCI are sent on the first resource and the third resource that are in the time unit n, where a part or all of the first UCI is carried on the first resource, and a part or all of the second UCI is carried on the third resource. To be specific, the third UCI and the fourth UCI are sent in the time unit n, where the third UCI is carried on the first resource, and the fourth UCI is carried on the third resource. This step may be performed by the terminal device or a chip in the terminal device.

Correspondingly, all or a part of the first UCI and all or a part of the second UCI are received on the first resource and the third resource that are in the time unit n, where a part or all of the first UCI is carried on the first resource, and a part or all of the second UCI is carried on the third resource. The third UCI and the fourth UCI are received in the time unit n, where the third UCI is carried on the first resource, and the fourth UCI is carried on the third resource. This step may be performed by the network device or a chip in the network device.

Optionally, the apparatus further includes a transceiver. The transceiver is configured to send the third UCI and fourth UCI in the time unit n, where the third UCI is carried on the first resource, and the fourth UCI is carried on the third resource.

Optionally, the apparatus further includes a transceiver. The transceiver is configured to receive the third UCI and fourth UCI in the time unit n, where the third UCI is carried on the first resource, and the fourth UCI is carried on the third resource.

Optionally, a quantity of OFDM symbols occupied by at least one of the third resource and the first resource in time domain is less than or equal to 2. To be specific, at least one of the third resource and the first resource corresponds to a short PUCCH.

For example, a quantity of OFDM symbols occupied by one of the third resource and the first resource in time domain is greater than 2, and a quantity of OFDM symbols occupied by the other of the third resource and the first resource in time domain is less than or equal to 2. Alternatively, that is, a quantity of OFDM symbols occupied by the third resource and a quantity of OFDM symbols occupied by the first resource in time domain are both less than or equal to 2.

Optionally, M is greater than or equal to 2, and the third resource is a PUCCH resource that occupies a minimum quantity of resource elements (REs) or RBs and that is in M1 PUCCH resources of the M PUCCH resources, where each of the M1 PUCCH resources meets a condition that a maximum quantity of bits that can be carried is greater than or equal to a sum of a quantity of all bits of the second UCI and a quantity of cyclic redundancy check (CRC) bits, and none of the M1 PUCCH resources includes a same OFDM symbol with the first resource in time domain. Therefore, if the M1 PUCCH resources and the first resource are all TDM, the selected third resource needs to accommodate all bits of the second UCI and CRC bits, and the third resource is a PUCCH resource that occupies a minimum quantity of REs or RBs and that is in the M1 PUCCH resources. Therefore, unnecessary resource waste may be avoided.

Optionally, a maximum quantity of bits that can be carried by one PUCCH resource is obtained based on $M_{RB}N_{sc}N_{symb}Q_m r_{max}$. For example, the maximum quantity of bits is $M_{RB}N_{sc}N_{symb}Q_m r_{max}$, where $M_{RB}$ is a quantity of RBs occupied by a PUCCH resource in frequency domain, $N_{sc}$ is a quantity of subcarriers included in each RB, $N_{symb}$ is a quantity of OFDM symbols occupied by the PUCCH resource in time domain, and $Q_m$ is a modulation order used on the PUCCH resource, for example, may be a modulation order used when CSI is sent on the PUCCH resource, and $r_{max}$ is a maximum channel coding code rate allowed by the PUCCH resource. The parameters may be configured by the access network device for the terminal device. For example, the access network device configures one PUCCH resource for the terminal device.

Optionally, the third resource is a PUCCH resource that includes a maximum quantity of REs in M2 PUCCH resources; or the third resource is a PUCCH resource that includes a maximum quantity of RBs in M2 PUCCH resources; or the third resource is a PUCCH resource that can carry a largest maximum quantity of bits in M2 PUCCH resources, and the M2 PUCCH resources are resources in the M PUCCH resources. In addition, all the M2 PUCCH resources and the first resource do not include a same OFDM symbol in time domain, and M2 is a positive integer. In this solution, a PUCCH resource that occupies a largest quantity of RBs or REs or that can carry a largest maximum quantity of bits is selected to carry all or a part of the second UCI, so that as much as information in the second UCI is sent, thereby improving system performance.

When a part of the second UCI is carried on the third resource, and the other part of the second UCI is not sent and may be discarded as required, a discarding rule may be predefined. For example, the fourth UCI may be determined from the second UCI based on priorities of CSI included in the second UCI. This is the same as a case in which a part of the first UCI is carried on the first resource.

Optionally, the determining a third resource in the time unit n includes:

determining M2 PUCCH resources in the M PUCCH resources, where all the M2 PUCCH resources and the first resource do not include a same OFDM symbol in time domain, and M2 is a positive integer; and determining a resource, in the M2 PUCCH resources, on which a maximum quantity of bits that can be carried is greater than or equal to a sum of a quantity of all bits of the second UCI and a quantity of CRC bits as the third resource.

If M2=1 PUCCH resource in the M PUCCH resources and the first resource are TDM, and the PUCCH resource can accommodate all bits of the second UCI and the CRC bits, the PUCCH resource is determined as the third resource.

Optionally, the determining a third resource in the time unit n includes:

determining M2 PUCCH resources in the M PUCCH resources, where all the M2 PUCCH resources and the first resource do not include a same OFDM symbol in time domain, and M2 is a positive integer;

determining that a resource on which a maximum quantity of bits that can be carried is greater than or equal to a sum of a quantity of all bits of the second UCI and a quantity of CRC bits does not exist in the M2 PUCCH resources; and determining that the third resource is a resource that meets the following condition and that is in the M2 PUCCH resources:

a PUCCH resource that occupies a largest quantity of REs and that is in the M2 PUCCH resources;

a PUCCH resource that occupies a largest quantity of RBs and that is in the M2 PUCCH resources; or a PUCCH resource that can carry a maximum quantity of bits and that is in the M2 PUCCH resources.

In this solution, if the M2 PUCCH resources in the M PUCCH resources and the first resource are TDM, but a resource that can accommodate all bits of the second UCI and the CRC bits does not exist in the M2 PUCCH resources, a PUCCH resource that is in the M2 resources and that occupies a largest quantity of REs or RBs or that can carry a largest maximum quantity of bits is determined as the third resource. Apart of the second UCI is carried on the third resource, so that as much as information in the second UCI is sent, thereby improving system performance.

Optionally, the determining that at least two PUCCH resources collide includes:

determining that the time unit n includes at least three PUCCH resources. To be specific, the determining that at least two PUCCH resources collide is equivalent to determining that the time unit n includes at least three PUCCH resources.

When it is determined that one time unit includes at least three PUCCH resources, and the at least three PUCCH resources are configured for UCI that needs to be sent, that is, the at least three pieces of UCI need to be sent in a same time unit, regardless of whether the at least three PUCCH resources occupy at least one same OFDM symbol, it is considered that PUCCHs conflict. In this way, a determining procedure may be simplified, helping to design a unified processing framework and simplify a designing principle.

Optionally, the determining that the time unit n includes at least three PUCCH resources includes:

determining, based on information about configuration for periodic CSI reporting (which may include information about a used PUCCH resource, and one or more of a period and a time unit offset for periodic CSI reporting), whether periodic CSI that needs to be sent exists in the time unit n, and determining a PUCCH resource configured for the periodic CSI that needs to be sent;

determining whether ACK/NACK that needs to be sent exists in the time unit n and determining a PUCCH resource configured and indicated for the ACK/NACK that needs to be sent; and determining, based on resource configuration information of an SR and the period and time unit offset for reporting the SR, whether an SR that needs to be sent exists in the time unit n and determining a PUCCH resource configured for the SR that needs to be sent.

According to the foregoing process, a PUCCH resource that originally needs to be sent and that is in the time unit n can be determined, that is, a quantity of PUCCH resources included in the time unit n is determined.

It should be noted that when determining the quantity of PUCCH resources included in the time unit n, the terminal device may determine the quantity of PUCCH resources based on the configuration information sent by the access network device. For example, whether the periodic CSI that needs to be sent exists in the time unit n, and the PUCCH resource configured for the periodic CSI that needs to be sent are determined based on the resource configuration information of periodic CSI reporting. The terminal device determines, based on DCI sent by the access network device, whether the ACK/NACK that needs to be sent exists in the time unit n and determines the PUCCH resource configured for the ACK/ACK that needs to be sent. The terminal device determines, based on the resource configuration information of the SR sent by the access network device, and a period, a time unit offset, and the like for reporting the SR, whether the SR that needs to be sent exists in the time unit n, and determines the PUCCH resource configured for the SR that needs to be sent.

The access network device can determine, based on the configuration information of the access network device, a quantity of PUCCH resources included in the time unit n.

Optionally, the determining that at least two PUCCH resources collide includes:

determining that the time unit n includes two PUCCH resources, and that quantities of OFDM symbols occupied by the two PUCCH resources are both greater than or equal to 4; or determining that the time unit n includes two PUCCH resources, and that the two PUCCH resources occupy at least one same OFDM symbol.

When a plurality of PUCCHs are sent on a same OFDM symbol in a frequency division multiplexing (FDM) manner, a peak to average power ratio (PAPR) of a signal sent by the terminal device is relatively large. Consequently, actual transmit power of the signal is relatively low, and PUCCH transmission performance is reduced. Therefore, in this solution, the plurality of PUCCHs are not sent in the FDM manner, so that the PUCCH transmission performance cannot be reduced.

It should be noted that that the time unit n in this embodiment of the present invention includes K PUCCH resources means that if the UCI that needs to be sent exists in the time unit n, it is determined, based on the configuration information and/or the DCI, that K PUCCH resources are configured for the UCI that needs to be sent. K is a specific value of the at least two PUCCH resources.

Optionally, a type of the first UCI is different from that of the second UCI, and the type of the first UCI includes one or more of HARQ-ACK information, CSI, and a scheduling request (SR), and the type of the second UCI includes one or more of HARQ-ACK information, CSI, and an SR.

For example, the type of the first UCI may be HARQ-ACK. SR, CSI, HARQ-ACK and SR, HARQ-ACK and CSI, SR and CSI, or HARQ-ACK, SR, and CSI. Another combination manner is not excluded. Further optionally, the first UCI includes at least HARQ-ACK and/or SR.

The type of the second UCI may be HARQ-ACK, SR, CSI, HARQ-ACK and SR, HARQ-ACK and CSI, SR and CSI, or HARQ-ACK. SR, and CS. Another combination manner is not excluded. Further optionally, the second UCI includes at least CSI.

However, the type of the first UCI is different from that of the second UCI.

A type of the UCI is determined based on content of the UCI, and the content of the UCI includes one or more of HARQ-ACK information, CSI, and an SR.

For example, the content of the UCI may be HARQ-ACK, SR, CSI, HARQ-ACK and SR, HARQ-ACK and CSI, SR and CSI, or HARQ-ACK, SR, and CSI.

Another combination manner is not excluded. Optionally, the determining the first resource includes:

determining that the at least two PUCCH resources include at least one resource configured for the HARQ-ACK information, where one resource is the first resource, and the first UCI includes the HARQ-ACK information.

Considering that a priority of the HARQ-ACK information is usually relatively high, the HARQ-ACK information is sent by using a PUCCH resource originally configured for the HARQ-ACK information, and is not sent on one PUCCH resource by multiplexing with other UCI, so that performance degradation of HARQ-ACK transmission resulting from multiplexing with the UCI may be avoided, or additional feedback delay of the HARQ-ACK introduced by multiplexing the HARQ-ACK with the other UCI is avoided.

Optionally, the determining the first resource includes:

determining that the at least two PUCCH resources include one resource configured for the first CSI and one resource configured for the second CSI, the first resource is the resource configured for the first CSI, the first UCI includes the first CSI, and the second UCI includes the second CSI.

Further optionally, the at least two PUCCH resources further include at least one resource configured for the HARQ-ACK information, and the second UCI further includes the HARQ-ACK information.

Optionally, a transmission parameter of the first CSI is greater than a transmission parameter of the second CSI, where the transmission parameter includes one or more of a quantity of reference bits before encoding, a quantity of reference bits after encoding, a priority of the CSI, and a configuration index of the CSI. Alternatively, a resource parameter of the resource carrying the first CSI is greater than a resource parameter of the resource carrying the second CSI, where the resource parameter includes one or more of a quantity of RBs occupied by a PUCCH resource, a quantity of REs occupied by the PUCCH resource, a quantity of OFDM symbols occupied on the PUCCH resource, and a maximum quantity of bits that can be carried on the PUCCH resource.

Optionally, the quantity of reference bits of the UCI may be an actual quantity of bits of the UCI, or under a specific condition, may be a maximum quantity of bits of the UCI, or a quantity of bits of the UCI at a value of a parameter. For example, if the UCI is CSI, the quantity of reference bits of the CSI may be a maximum quantity of bits of the CSI at all values of the CRI/RI, or the quantity of reference bits of the CSI is a quantity of bits of the CSI at a predefined value of the CRI/RI, or a maximum quantity of bits of the CSI within a value range of another measurement parameter. The quantity of reference bits of the CSI may have other forms.

Optionally, a transmission parameter of the first CSI is greater than a transmission parameter of the second CSI, where the transmission parameter is determined based on one or more of a quantity of reference bits before encoding, a quantity of reference bits after encoding, a priority of the CSI, and a configuration index of the CSI. Alternatively, a resource parameter of the resource carrying the first CSI is greater than a resource parameter of the resource carrying the second CSI, where the resource parameter is determined based on one or more of a quantity of RBs occupied by a PUCCH resource, a quantity of REs occupied by the PUCCH resource, a quantity of OFDM symbols occupied by the PUCCH resource, and a maximum quantity of bits carried on the PUCCH resource.

Optionally, a transmission parameter of the first CSI is less than a transmission parameter of the second CSI, where the transmission parameter includes one or more of a quantity of reference bits before encoding, a quantity of reference bits after encoding, a priority of the CSI, and a configuration index of the CSI. Alternatively, a resource parameter of the resource carrying the first CSI is less than a resource parameter of the resource carrying the second CSI, where the resource parameter includes one or more of a quantity of RBs occupied by the PUCCH resource, a quantity of REs occupied by the PUCCH resource, a quantity of OFDM symbols occupied by the PUCCH resource, and a maximum quantity of bits carried on the PUCCH resource.

Optionally, a transmission parameter of the first CSI is less than a transmission parameter of the second CSI, where the transmission parameter is determined based on one or more of a quantity of reference bits before encoding, a quantity of reference bits after encoding, a priority of the CSI, and a configuration index of the CSI. Alternatively, a resource parameter of the resource carrying the first CSI is less than a resource parameter of the resource carrying the second CSI, where the resource parameter is determined based on one or more of a quantity of RBs occupied by the PUCCH resource, a quantity of REs occupied by the PUCCH resource, a quantity of OFDM symbols occupied by the PUCCH resource, and a maximum quantity of bits carried on the PUCCH resource.

In this implementation, the first CSI is CSI that occupies a largest time-frequency resource, and the first CSI is still sent by using a PUCCH resource originally configured for the first CSI. In this way, this part of originally configured and relatively large resources cannot be wasted. Therefore, a waste that is of the PUCCH resource originally configured for the first CSI and that is caused by multiplexing all CSI to one PUCCH resource may be avoided to a maximum extent, and utilization of the PUCCH resource is improved.

According to a third aspect, a communications apparatus is provided. The communications apparatus is configured to perform the foregoing method. The functions may be implemented by hardware, or may be implemented by hardware executing corresponding software. The hardware or the software includes one or more units corresponding to the foregoing functions.

According to a fourth aspect, a computer storage medium including an instruction is provided. When the computer storage medium is run on a computer, the computer is enabled to perform the foregoing method.

According to a fifth aspect, a computer program product including an instruction is provided. When the computer program product is run on a computer, the computer is enabled to perform the method according to the foregoing aspect.

DESCRIPTION OF EMBODIMENTS

The following describes the technical solutions in the embodiments of the present invention with reference to the accompanying drawings in the embodiments of the present invention. It should be noted that the technical solutions or features in the embodiments of the present invention may be mutually combined when no conflict occurs.

In the embodiments of the present invention, "a/an" means a single individual, and does not indicate that "a/an" can only be one individual and cannot be applied to another individual. For example, in the embodiments of the present invention, "a terminal device" refers to a particular terminal device, and this does not mean that "a terminal device" can be applied only to one particular terminal device. The terms "system" and "network" may be used interchangeably in this application.

A reference to "an embodiment" (or "an implementation") or "embodiments" (or "implementations") in this application means that a specific feature, a structure, a feature, and the like that are described with the embodiments are included in at least one embodiment. Therefore, "in an embodiment" or "in the embodiments" that appears throughout this specification does not represent a same embodiment.

Further, in the embodiments of the present invention, the terms "and/or" and "at least one" used in cases of "A and/or B" and "at least one of A and B" include any one of three scenarios: a scenario in which A is included but B is excluded, a scenario in which B is included but A is excluded, and a scenario in which both options A and B are included. For another example, in a case of "A. B. and/or C" and "at least one of A, B, and/or C", this phrase includes any one of six scenarios: a scenario in which A is included but both B and C are excluded, a scenario in which B is included but both A and C are excluded, a scenario in which C is included but both A and B are excluded, a scenario in which both A and B are included but C is excluded, a scenario in which both B and C are included but A is excluded, a scenario in which both A and C are included but B is excluded, and a scenario in which three options A, B, and C are included. As easily understood by a person of ordinary skill in the art and a related art, all other similar descriptions can be understood in the foregoing manner in the embodiments of the present invention.

Figure 1:
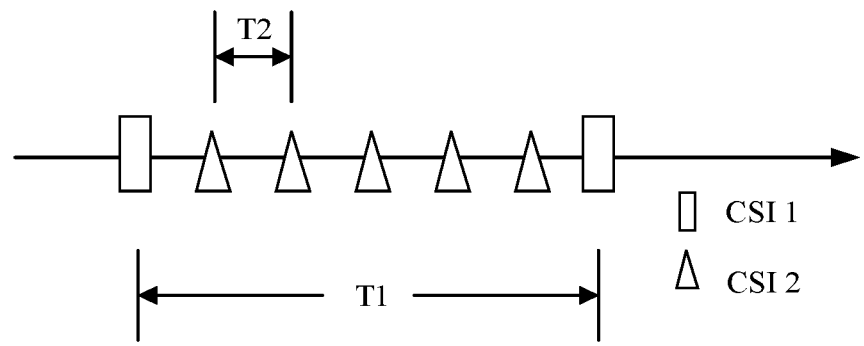
FIG. 1 is a schematic diagram showing that two pieces of periodic CSI reporting are sent.
Figure 2:
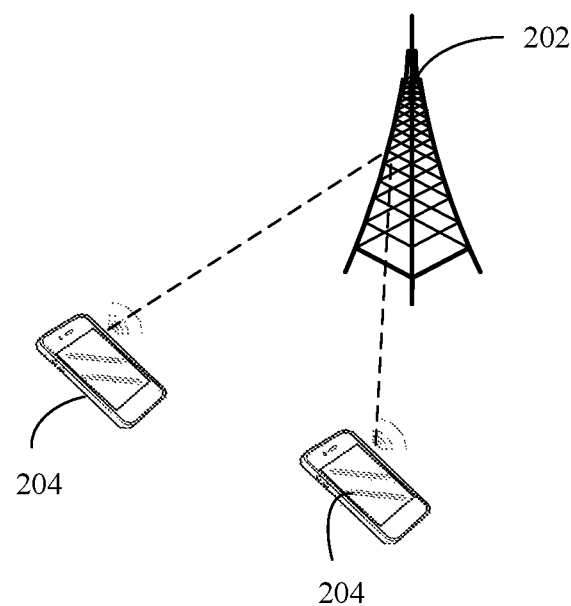
FIG. 2 is a schematic diagram of a wireless communications system applied to an embodiment of the present invention.

FIG. 2 is a schematic diagram of communication between a wireless device and a wireless communications system. The wireless communications system may be a system applied to various radio access technologies (RAT), for example, code division multiple access (CDMA), time division multiple access (TDMA), frequency division multiple access (FDMA), orthogonal frequency division multiple access (OFDMA), or single carrier frequency division multiple access (SC-FDMA), and another system. For example, the wireless communications system may be an LTE system, a CDMA system, a wideband code division multiple access (WCDMA) system, a global system for mobile communications (GSM) system, a wireless local area network (WLAN) system, a new radio (NR) system, various evolved or converged systems, and a system using a future communications technology. System architectures and service scenarios described in the embodiments of the present invention are intended to describe the technical solutions in the embodiments of the present invention more clearly, and do not constitute any limitation on the technical solutions provided in the embodiments of the present invention. A person of ordinary skill in the art may know that with evolution of a network architecture and emergence of a new service scenario, the technical solutions provided in the embodiments of the present invention are also applicable to similar technical problems.

For brevity, FIG. 2 shows communication between one network device 202 (for example, an access network device) and two wireless devices 204 (for example, terminal devices). Usually, the wireless communications system may include any quantity of network devices and terminal devices. The wireless communications system may further include one or more core network devices, one or more devices configured to bear a virtualized network function, or the like. The access network device 202 may provide services for the wireless devices by using one or more carriers. In this application, the access network device and the terminal device are collectively referred to as a communications apparatus.

In this application, the access network device 202 is an apparatus that is deployed in a radio access network and that is used to provide a wireless communication function for the terminal devices. The access network device may include a macro base station (BS), a micro base station (also referred to as a small cell), a relay node, an access point, or the like in various forms. In systems that use different radio access technologies, the names of devices that have a radio access function may be different. For example, in an LTE system, the device is referred to as an evolved NodeB (eNB or eNodeB), and in a third-generation (3G) system, the device is referred to as a NodeB, and the like. For ease of description, in this application, the device is referred to as an access network device for short, and sometimes is also referred to as a base station.

The wireless device in the embodiments of the present invention may include various handheld devices, vehicle-mounted devices, wearable devices, or computing devices that have a wireless communication function, or another processing device connected to a wireless modem. The wireless device may be referred to as a terminal device, or may be referred to as a mobile station (MS for short), a terminal, UE, or the like. The wireless device may include a subscriber unit, a cellular phone, a smartphone, a wireless data card, a personal digital assistant (PDA) computer, a tablet computer, a modem or a modem processor, a handheld (handheld) device, a laptop computer, a netbook, a cordless phone, or a wireless local loop (WLL) station, a Bluetooth device, a machine type communication (MTC) terminal, and the like. For ease of description, the wireless device is referred to as terminal devices or UE in this application.

The wireless device may support one or more wireless technologies used for wireless communication, for example, 5G, LTE, WCDMA, CDMA, 1×, time division-synchronous code division multiple access (TS-SCDMA), GSM, 802.11, and the like. The wireless device may also support a carrier aggregation technology.

A plurality of wireless devices may perform a same service or different services, for example, a mobile broadband service, an enhanced mobile broadband (eMBB) service, and an ultra-reliable and low-latency communication (URLLC) service set by a terminal.

Figure 3:
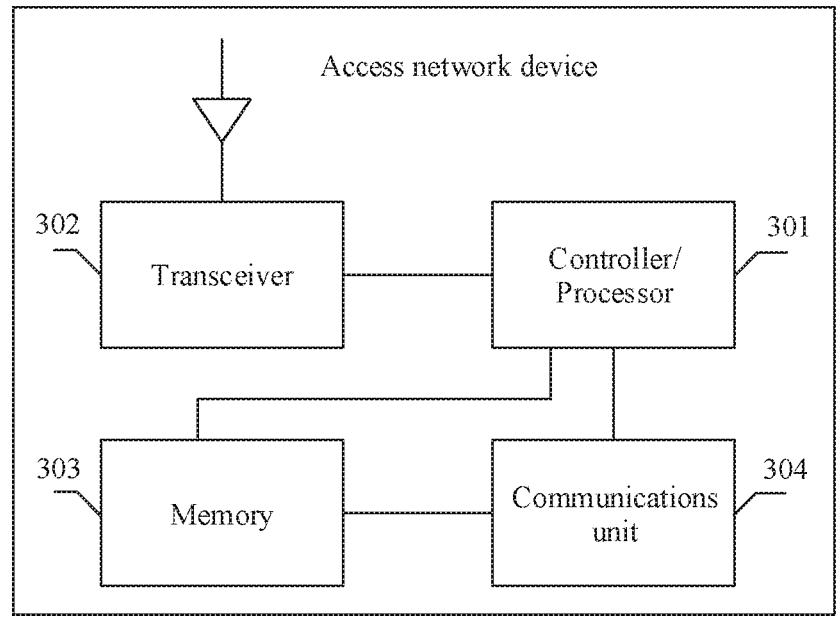
FIG. 3 is a possible schematic structural diagram of an access network device in the foregoing wireless communications system.

Further, a possible schematic structural diagram of the access network device 202 may be shown in FIG. 3. The access network device 202 can perform the method provided in the embodiments of the present invention. The access network device 202 may include a controller or a processor 301 (the processor 301 is used as an example below for description) and a transceiver 302. The controller/processor 301 is sometimes also referred to as a modem processor. The modem processor may include a baseband processor (BBP) (not shown). The BBP processes a received digitized signal, to extract information or a data bit transmitted in the signal. Therefore, based on a requirement or an expectation, the BBP is usually implemented in one or more digital signal processors (DSPs) in the modem processor or implemented as a separated integrated circuit (IC).

The transceiver 302 may be configured to: support information receiving and sending between the access network device 202 and the terminal devices, and support radio communication between the terminal devices. The processor 301 may be further configured to perform various functions for communication between the terminal devices and another network device. On an uplink, an uplink signal from the terminal device is received by using an antenna, demodulated by the transceiver 302, and further processed by the processor 301, to restore service data and/or signaling information sent by the terminal device. On a downlink, service data and/or a signaling message are/is processed by the terminal device and modulated by the transceiver 302 to generate a downlink signal, and the downlink signal is transmitted to the terminal device by using an antenna. The access network device 202 may further include a memory 303, and the memory 303 may be configured to store program code and/or data of the access network device 202. The transceiver 302 may include an independent receiver circuit and an independent transmitter circuit, or may implement receiving and sending functions in a same circuit. The access network device 302 may further include a communications unit 304, configured to support the access network device 302 in communicating with another network entity, for example, configured to support the access network device 202 in communicating with a network device or the like in a core network.

Optionally, the access network device may further include a bus. The transceiver 302, the memory 303, and the communications unit 304 may be connected to the processor 301 through the bus. For example, the bus may be a peripheral component interconnect (PCI) bus, an extended industry standard architecture (EISA) bus, or the like. The bus may include an address bus, a data bus, a control bus, and the like.

Figure 4:
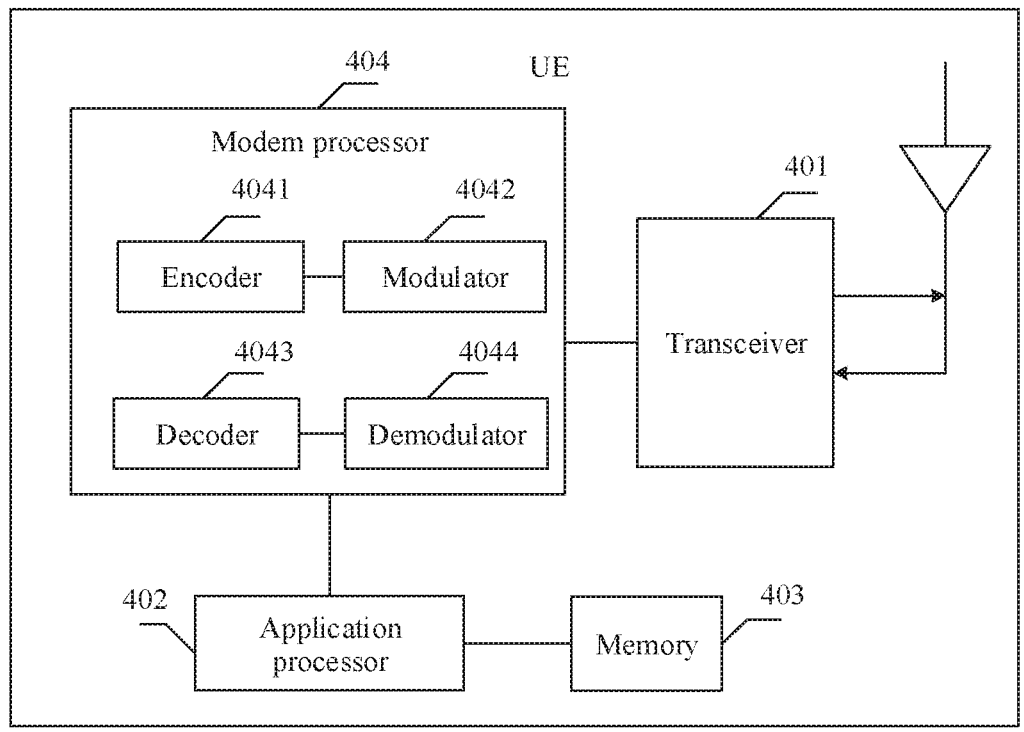
FIG. 4 is a possible schematic structural diagram of a terminal device in the foregoing wireless communications system.

FIG. 4 is a possible schematic structural diagram of a terminal device in the foregoing wireless communications system. The terminal device can perform the method provided in the embodiments of the present invention. The terminal device may be either of the two terminal devices 204. The terminal device includes a transceiver 401, an application processor 402, a memory 403, and a modem processor 404.

The transceiver 401 may adjust (for example, perform analog conversion, filtering, amplification, and up-conversion on) an output sample and generate an uplink signal. The uplink signal is transmitted to a base station in the foregoing embodiments by using an antenna. On a downlink, the antenna receives a downlink signal transmitted by an access network device. The transceiver 401 may adjust (for example, perform filtering, down-conversion, and digitalization on) a signal received from the antenna and provide an input sample.

The modem processor 404 is sometimes also referred to as a controller or a processor, and may include a BBP (not shown). The BBP processes a received digitized signal, to extract information or a data bit transmitted in the signal. Based on a requirement or an expectation, the BBP is usually implemented in one or more digits in the modem processor 404 or implemented as a separated IC.

In a design, the modem processor 404 may include an encoder 4041, a modulator 4042, a decoder 4043, and a demodulator 4044. The encoder 4041 is configured to encode a to-be-sent signal. For example, the encoder 4041 may be configured to: receive service data and/or a signaling message that are/is to be sent on an uplink, and perform processing (for example, formatting, encoding, or interleaving) on the service data and the signaling message. The modulator 4042 is configured to modulate an output signal of the encoder 4041. For example, the modulator may perform processing such as symbol mapping and/or modulation on the output signal (data and/or signaling) of the encoder, and provide an output sample. The demodulator 3044 is configured to demodulate an input signal. For example, the demodulator 4044 processes the input sample and provides symbol estimation. The decoder 4043 is configured to decode a demodulated input signal. For example, the decoder 4043 performs processing such as de-interleaving and/or decoding on the demodulated input signal, and outputs a decoded signal (data and/or signaling). The encoder 4041, the modulator 4042, the demodulator 4044, and the decoder 4043 may be implemented by the combined modem processor 404. The units perform processing based on a radio access technology used in a radio access network.

The modem processor 404 receives, from the application processor 402, digitalized data that may represent voice, data, or control information, and processes the digitalized data for transmission. The modem processor may support one or more of a plurality of wireless communication protocols of a plurality of communications systems, for example, LTE, NR, a universal mobile telecommunications system (UMTS), and high speed packet access (HSPA). Optionally, the modem processor 404 may also include one or more memories.

Optionally, the modem processor 404 and the application processor 402 may be integrated in one processor chip.

The memory 403 is configured to store program code (sometimes referred to as a program, an instruction, software, or the like) and/or data that are/is used to support the terminal device in communication.

It should be noted that the memory 303 or the memory 403 may include one or more storage units, for example, may be a storage unit inside the processor 301, the modem processor 404, or the application processor 402 that is configured to store program code, or may be an external storage unit independent of the processor 301, the modem processor 404, or the application processor 402, or may be a component including a storage unit inside the processor 301, the modem processor 404, or the application processor 402 and an external storage unit independent of the processor 301, the modem processor 404, or the application processor 402.

The processor 301 and the modem processor 404 may be processors of a same type, or may be processors of different types. For example, the processor 301 and the modem processor 404 may be implemented as a central processing unit (CPU), a general-purpose processor, a DSP, an application-specific integrated circuit (ASIC), a field programmable gate array (FPGA) or another programmable logic device, a transistor logic device, a hardware component, another IC, or any combination thereof. The processor 301 and the modem processor 404 may implement or execute various example logical blocks, modules, and circuits described with reference to content disclosed in the embodiments of the present invention. Alternatively, the processor may be a combination of components implementing computing functions, for example, a combination of one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. As an example, the devices described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

It should be noted that the time unit described in the embodiments of the present invention may be a slot, a subframe, or a time-frequency resource on N OFDM symbols.

When at least two PUCCH resources configured for periodic CSI, semi-persistent CSI, and/or HARQ-ACK information in a time unit occupy at least one same OFDM symbol, a problem that PUCCH resources collide occurs.

Figure 5:
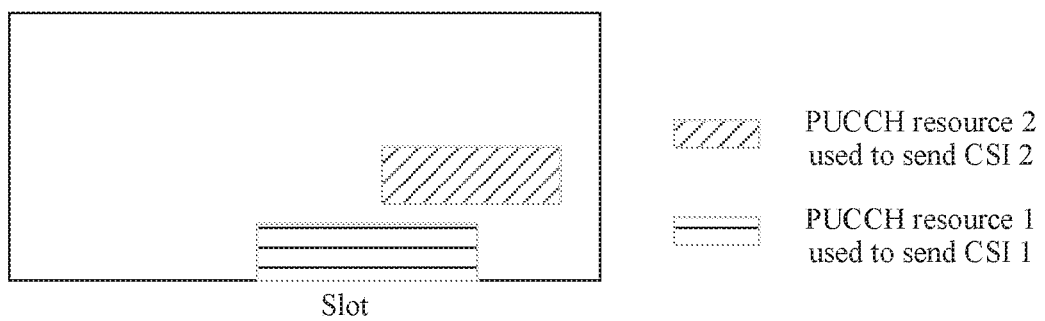
FIG. 5 is a schematic diagram showing a case in which PUCCH resources collide.

FIG. 5 is a schematic diagram showing a case in which PUCCH resources collide. In this example, a time unit is a slot. It can be learned that in the slot, a PUCCH resource 1 used to send CSI 1 and a PUCCH resource used to send CSI 2 have some same time domain resources.

In addition to collision between PUCCH resources of periodic CSI, collision may also occur between a PUCCH resource of an ACKNACK and a PUCCH resource of the periodic CSI.

Figure 6:
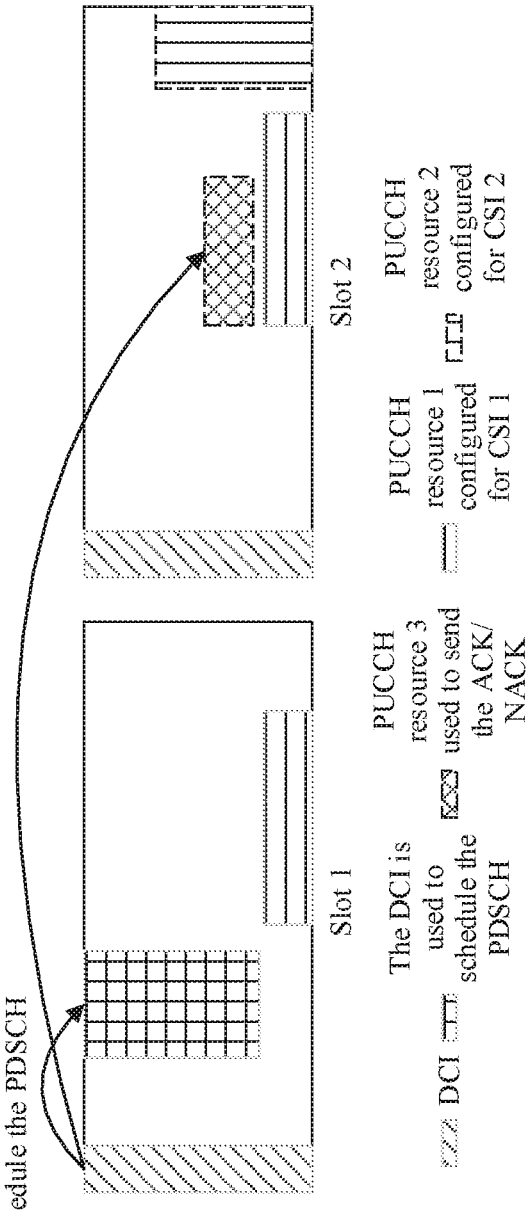
FIG. 6 is a schematic diagram showing another case in which PUCCH resources collide.
Figure 7:
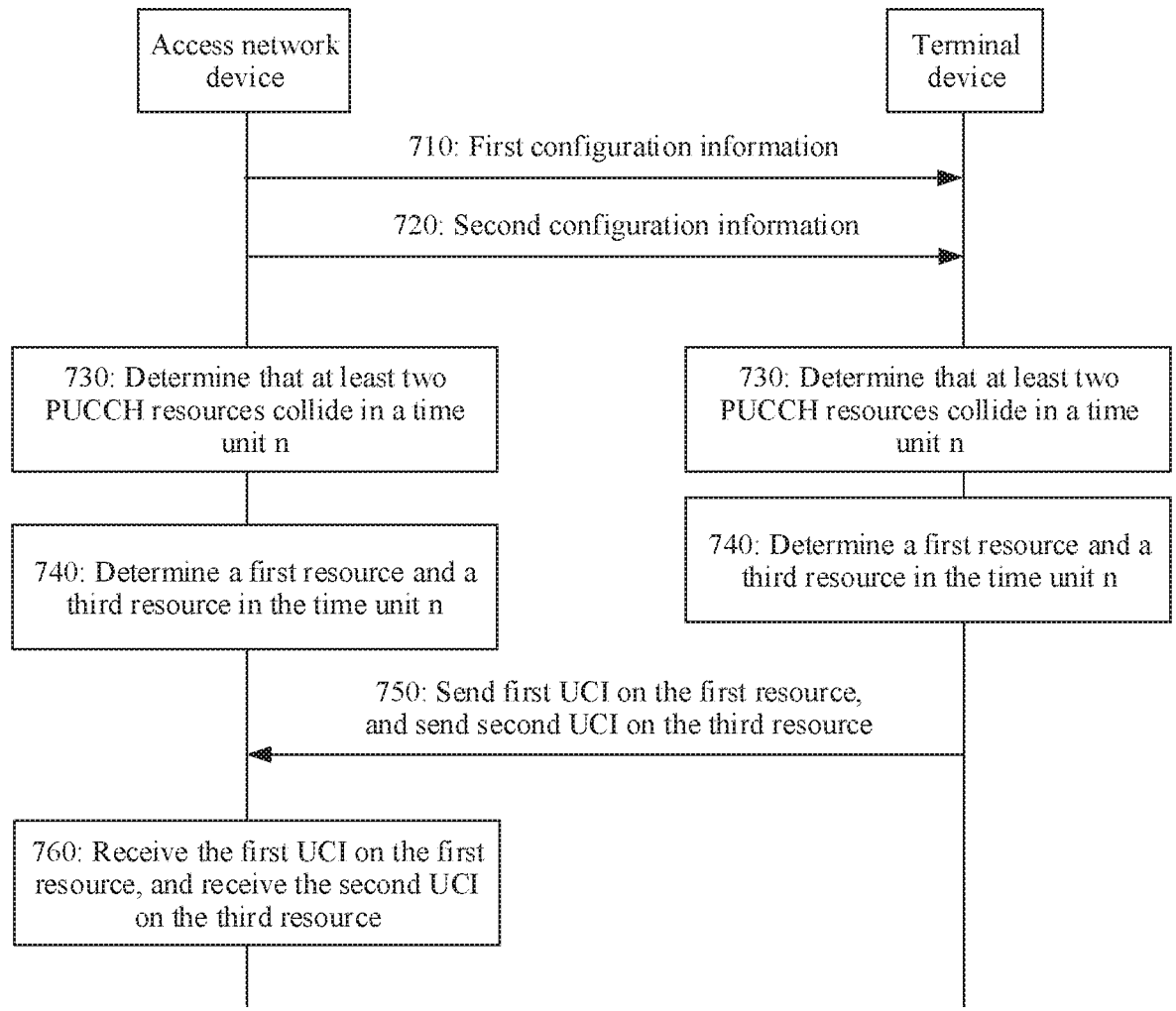
FIG. 7 is a schematic signaling diagram of a method according to an embodiment of the present invention.

FIG. 6 is a schematic diagram showing another case in which PUCCH resources collide. In this example, a time unit is a slot. It can be learned that in a slot 1, a PDSCH is scheduled by using DCI. It is determined, based on the DCI and a quantity of bits of an ACK/NACK corresponding to the PDSCH, that a PUCCH resource fed back for an ACK/NACK of the PDSCH is a PUCCH resource 3 in a slot 2. Based on configuration of the periodic CSI, in the slot 2, CSI 1 and CSI 2 originally need to be respectively fed back on the PUCCH resource 1 and the PUCCH resource 2. In this case, the PUCCH resource 3 used to feed back the ACKNACK collides with the PUCCH resource 1 used to feed back the CSI 1. In addition, currently, a maximum of two PUCCHs can be sent/received in only one slot. Therefore, in this embodiment of the present invention, as shown in FIG. 6, transmitting or receiving 3 PUCCH resources in one slot is also considered as collision.

Although colliding PUCCH may occupy different subcarriers, sending two pieces of UCI on a same OFDM symbol by using two FDM PUCCH resources may cause a deterioration to transmission performance of the UCI. This is because when a plurality of PUCCHs are sent on a same OFDM symbol in an FDM manner, a PAPR of a signal sent by the terminal device is relatively large. Consequently, actual transmit power of the signal is relatively low, and UCI transmission performance is reduced. Therefore, in a next-generation communications system, the terminal device is not supported to send the UCI in the FDM manner by using the PUCCH resource that occupies the at least one same OFDM symbol. Therefore, embodiments of the present invention provide a resource determining method and apparatus for sending UCI in a time unit in a TDM manner when at least two configured PUCCH resources collide.

Further, two PUCCH formats: a long PUCCH and a short PUCCH are defined in the next-generation communications system. One long PUCCH resource may occupy four to 14 OFDM symbols, and one short PUCCH resource may occupy one or two OFDM symbols.

Currently, one terminal device can send UCI in one time unit by using at most two PUCCH resources in a TDM manner. The two PUCCH resources may be a resource corresponding to one short PUCCH and a resource corresponding to one long PUCCH. Alternatively, the two PUCCH resources may be resources corresponding to two short PUCCHs. The two PUCCH resources cannot be resources corresponding to two long PUCCHs.

When a plurality of PUCCH resources of periodic CSI collide, the following mechanism is defined in the next-generation wireless communications system to resolve a PUCCH collision problem.

1: An access network device configures one or two PUCCH resources for a terminal device. In this specification, the PUCCH is referred to as a multi-CSI PUCCH resource.

2: When colliding PUCCH resources do not appear in a slot, the terminal device sends CSI on a PUCCH resource corresponding to each piece of CSI. Herein, a definition of colliding PUCCH resources of periodic CSI is that two PUCCH resources configured for two pieces of periodic CSI occupy at least one same OFDM symbol.

3: When two or more colliding PUCCH resources appear in a slot, the terminal device selects one multi-CSI PUCCH resource from the plurality of multi-CSI PUCCH resources based on a predefined rule, to carry UCI carried in the colliding PUCCH resources.

The access network device may predict whether the plurality of PUCCH resources collide in one slot. Therefore, the access network device may determine one multi-CSI PUCCH resource based on the foregoing rule, and detect the UCI on the multi-CSI PUCCH resource.

However, in the prior art, when N PUCCH resources collide, the originally configured N PUCCH resources are no longer used, and the multi-CSI PUCCH resources are used to transmit the UCI corresponding to the N PUCCHs. This method causes a waste of the N PUCCHs, and especially when a value of N is relatively large, a relatively serious waste of the PUCCH resources is caused. To resolve this problem, an embodiment of the present invention provides a method, so that a waste of originally configured PUCCH resources can be reduced as much as possible while resolving a problem that the PUCCH resources collide.

For a case in which a PUCCH resource of the CSI collides with a PUCCH resource of the ACK/NACK, the problem that the PUCCH resources collide is resolved in the prior art according to the following mechanism.

1: The terminal device determines a set $S_j$ from K PUCCH resource sets $S_1, \ldots,$ and $S_K$ based on a total quantity of bits of the CSI and the ACK/NACK that need to be sent in a time unit i.

2: The terminal device determines a PUCCH resource x in the set $S_j$ based on the DCI.

3: The terminal device transmits the ACK/NACK and the CSI by using the selected PUCCH resource x.

It may be learned that in the prior art, all CSI and ACK/NACK are placed in a same PUCCH resource for transmission. When there are a relatively large quantity of bits of the CSI, or when a plurality of PUCCH resources of the CSI collide with PUCCH resources of the ACK/NACK, because there are usually a relatively large quantity of bits of the CSI, when a finally selected PUCCH resource occupies a relatively small quantity of time-frequency resources and the CSI and the ACK/NACK are transmitted together, a channel coding code rate of the ACK/NACK is relatively high, and consequently transmission reliability of the ACK/NACK is affected. To resolve this problem, an embodiment of the present invention provides a method, so that impact of performance on the ACK/NACK can be reduced as much as possible while resolving a problem that the PUCCH resources collide.

The following first describes terms in the embodiments of the present invention.

At least two PUCCH resources may be periodic resources configured for the CSI, or may be resources used to feed back ACK/NACK. Each PUCCH resource may be uniquely determined by one or more parameters. For example, one PUCCH resource may be uniquely determined by defining an index of an occupied OFDM symbol, an index of an occupied RB, a PUCCH format, and the like. It should be noted that a parameter used to uniquely determine one PUCCH resource may also include another parameter, for example, orthogonal cover code (OCC) and/or a maximum channel coding code rate.

"N PUCCH resources" described in this specification may correspond to configuration of the N PUCCH resources, and configuration of each PUCCH resource includes all or a part of the foregoing resource parameters. The resource parameters corresponding to different configurations of the PUCCH resources may be partially or completely different. Each PUCCH resource may be uniquely determined by one or more resource parameters. For example, the resource parameter may be one or more of an index of an OFDM symbol occupied by the PUCCH resource, an index of RBs occupied by the PUCCH resource, a PUCCH format, and the like. The resource parameter may further include OCC and/or a maximum channel coding code rate.

The at least two PUCCH resources include a first PUCCH resource (first resource for short) configured for first UCI and a second PUCCH resource (second resource for short) configured for second UCI.

The first UCI may be an ACKNACK, or may be an ACKNACK and an SR or may be first CSI, or may be ACK/NACK and first CSI. The first CSI may also be one or more of CRI, CQI, PMI, RI, and RSRP. Further, the first CSI may be periodic CSI or semi-persistent CSI.

The second UCI may be second CSI. The second CSI may be one or more of CRI, CQI, PMI, RI, and RSRP. Further, the second CSI may be periodic CSI or semi-persistent CSI.

Alternatively, the second UCI may be second CSI and an SR, or second CSI and NACK/ACK, or second CSI, ACK/NACK, and an SR. Another case is not excluded.

The access network device may send to the terminal device, by using signaling, information about a periodic resource configured for the CSI. The used signaling may be RRC higher layer signaling or media access control control element (MAC CE) signaling. The resource used to feed back the ACK/NACK may be determined based on configuration of the higher layer signaling and/or the MAC CE signaling and an indication of the DCI. For example, the higher layer signaling configures X resources, and the DCI determines, by using $\lceil \log_2 X \rceil$ bits, a resource that is in the X resources and that is used at this time.

The M PUCCH resources may be one or more PUCCH resources configured by the access network device for the terminal device by using signaling, for example, may be the multi-CSI PUCCH resource described above. The used signaling may be RRC higher layer signaling or MAC CE signaling.

It should be noted that a relationship between the M PUCCH resources and the at least two PUCCH resources is not limited in this embodiment of the present invention. For example, the M PUCCH resources and the at least two PUCCH resources may be totally different, or the M PUCCH resources and the at least two PUCCH resources may include a part of same frequency domain resources, or the M PUCCH resources and the at least two PUCCH resources may include a part of same time domain resources. Alternatively, the M PUCCH resources include at least two PUCCH resources. A unit of the frequency domain resource may be a subcarrier or an RB (which includes a plurality of consecutive subcarriers), and a unit of the time domain resource may be an OFDM symbol.

The time unit may be a slot, a subframe, a plurality of OFDM symbols, or the like.

An OFDM symbol is a minimum unit of a time domain resource.

In this embodiment of the present invention, when at least two PUCCH resources collide in a time unit n, a part or all of the first UCI that originally should be carried on the first resource and a part or all of the second UCI that originally should be carried in the second resource are separately carried on the first resource and the third resource in the time unit n for sending. The third resource is one of M PUCCH resources, the first resource and the third resource do not include a same OFDM symbol in time domain, and M is a positive integer greater than or equal to 1.

In the foregoing solution, when the at least two PUCCH resources collide, the first resource and the third resource in the time unit n are determined. The third resource and the first resource do not include a same OFDM symbol in time domain. To be specific, a part or all of the first resource used to carry the first UCI and a part or all of the third resource used to carry the second UCI are time division. Therefore, the foregoing solution provides a possibility of sending a part or all of the first UCI and a part or all of the second UCI in a TDM manner in one time unit. Further, because a part or all of the first UCI is still carried on the first resource configured for the first UCI, factors such as transmission reliability and a feedback delay of the UCI transmitted on the first resource may be prevented from being affected by collision of PUCCH resources.

In comparison, in the prior art, when at least two PUCCH resources collide, all UCI that needs to be sent is placed in a reselected PUCCH resource for transmission. The reselected PUCCH resource is also preconfigured, and is different from a PUCCH resource in collided PUCCH resources. Because a quantity of OFDM symbols occupied by the reselected PUCCH resource may be different from a quantity of OFDM symbols occupied by the first resource, and the first OFDM symbol occupied by the reselected PUCCH resource may also be different from the first OFDM symbol occupied by the first resource, the UCI on the first resource is sent by using the reselected PUCCH resource. As a result, a feedback delay of the UCI on the first resource is affected. If the UCI that originally needs to be carried on the first resource is an ACK/NACK, and the ACK/NACK that needs to be fed back this time needs to be fed back quickly (for example, an ACK/NACK fed back for a low-latency service), if the first OFDM symbol occupied by the reselected PUCCH resource is later than the first OFDM symbol occupied by the first resource, an additional feedback delay is introduced when the foregoing ACK/NACK is transmitted by using the reselected PUCCH resource. In addition, if all UCI that needs to be carried on the reselected PUCCH resource includes CSI and ACK/NACK, and a quantity of bits of the CSI is usually relatively large, when a quantity of time-frequency resources occupied by the reselected PUCCH resource is relatively small and the CSI and the ACK/NACK are transmitted together, a channel coding code rate of the ACK/NACK is relatively high, and consequently, transmission reliability of the ACKNACK is affected.

In an optional solution, M is greater than or equal to 2, and the third resource is a PUCCH resource that occupies a minimum quantity of REs or RBs and that is in M1 PUCCH resources, where the M1 PUCCH resources are resources in the M PUCCH resources, and each of the M1 PUCCH resources meets a condition that a maximum quantity of bits that can be carried is greater than or equal to a sum of a quantity of all bits of the second UCI and a quantity of CRC bits, and none of the M1 PUCCH resources includes a same OFDM symbol with the first resource in time domain, and M1 is an integer greater than or equal to 2.

It should be noted that in this embodiment of the present invention, that the first resource and the third resource do not include a same OFDM symbol in time domain may also be referred to as that the first resource and the third resource do not overlap in time domain.

In the foregoing optional solution, if the M1 PUCCH resources and the first resource are all TDM, the selected third resource can accommodate all bits of the second UCI and CRC bits, and the third resource is a PUCCH resource that occupies a minimum quantity of REs or RBs and that is in the M1 PUCCH resources. Therefore, unnecessary resource waste may be avoided.

Further, the maximum quantity of bits that can be carried by the PUCCH resource may be determined based on $M_{RB}N_{sc}N_{symb}Q_m r_{max}$. $M_{RB}$ is a quantity of RBs occupied by the PUCCH resource in frequency domain, $N_{sc}$ is a quantity of subcarriers included in each RB, $N_{symb}$ is a quantity of OFDM symbols occupied by the PUCCH resource in time domain, and $Q_m$ is a modulation order used on the PUCCH resource, for example, a modulation order used when CSI is sent on the PUCCH resource, and $r_{max}$ is a maximum channel coding code rate allowed by the PUCCH resource. The parameters may be configured by the access network device for the terminal device. For example, the access network device configures one PUCCH resource for the terminal device. Optionally, a maximum quantity of bits that can be carried by the PUCCH resource may be $M_{RB}N_{sc} N_{symb}Q_m r_{max}$.

In another optional solution, the third resource is a PUCCH resource that occupies a largest quantity of REs and that is in M2 PUCCH resources; or the third resource is a PUCCH resource that occupies a largest quantity of RBs and that is in M2 PUCCH resources; or the third resource is a PUCCH resource that can carry a largest maximum quantity of bits in M2 PUCCH resources, and the M2 PUCCH resources are resources in the M PUCCH resources. In addition, none of the M2 PUCCH resources includes a same OFDM symbol with the first resource in time domain, and M2 is a positive integer. In this solution, a PUCCH resource that occupies a largest quantity of RBs or REs or that can carry a largest maximum quantity of bits is selected to carry all or a part of the second UCI, so that as much as information in the second UCI is sent, thereby improving system performance.

It should be noted that a part of the first UCI is carried on the first resource indicates that the other part of the first UCI is not sent in the time unit n, or the other part of the first UCI may be discarded. That a part of the second UCI is carried on the third resource indicates that the other part of the second UCI is not sent in the time unit n, or the other part of the second UCI may be discarded.

There may be a plurality of manners for selecting a to-be-sent part. For example, the to-be-sent part may be selected based on a priority of the CSI, a quantity of reference bits of the CSI, a quantity of REs or RBs occupied by the PUCCH resource corresponding to each CSI, or an ID number configured by the CSI. For example, CSI with a high priority included in the first UCI is selected, or CSI with a large quantity of reference bits included in the first UCI is selected.

Optionally, the quantity of reference bits of the CSI may be an actual quantity of bits of the CSI, or may be a maximum quantity of bits of the CSI at all possible values of the CRI and/or the RI, or may be a quantity of bits of the CSI at a fixed value of the CRI and/or the RI. The quantity of reference bits of the CSI may further have another definition.

Further, a quantity of OFDM symbols occupied by at least one of the third resource and the first resource in time domain is less than or equal to 2. For example, a quantity of OFDM symbols occupied by one of the third resource and the first resource in time domain is greater than 2, and a quantity of OFDM symbols occupied by the other of the third resource and the first resource in time domain is less than or equal to 2. That is, one of the third resource and the first resource corresponds to a long PUCCH, and the other corresponds to a short PUCCH. Alternatively, both the quantity of OFDM symbols occupied by the third resource and the quantity of OFDM symbols occupied by the first resource in time domain are less than or equal to 2. That is, the third resource and the first resource correspond to the short PUCCH.

With reference to the foregoing embodiments, the following further provides a method for determining a resource in the embodiments of the present invention.

Step 710: An access network device sends first configuration information to a terminal device, and the terminal device receives the first configuration information.

This step is an optional step. The access network device and the terminal device may alternatively determine the first configuration information in another manner. For example, the access network device and the terminal device determine the first configuration information based on a preset setting.

As described above, the first configuration information may be sent by using higher layer signaling.

The first configuration information is used to indicate A reporting configurations of CSI sent based on PUCCH resources. A is a positive integer greater than or equal to 1. Further, the first configuration information may further indicate a PUCCH resource $PUCCH_i$ on which an $i^{th}$ reporting configuration of the CSI in the A reporting configurations of the CSI is based. Optionally, the at least two PUCCH resources may include the $PUCCH_i$.

The actions in this step may be implemented by the transceiver 401 of the terminal device 204. Certainly, the actions may alternatively be implemented by the modem processor 404 and the transceiver 401 that are of the terminal device 204. The actions in this step may be implemented by the transceiver 302 of the access network device 202. Certainly, the actions may alternatively be implemented by the processor 301 and the transceiver 302 that are of the access network device 202.

Step 720: The access network device sends second configuration information to the terminal device, where the second configuration information is used to indicate M PUCCH resources. For example, the second configuration information is used to indicate resource information corresponding to the M PUCCHs.

This step is an optional step. The access network device and the terminal device may alternatively determine the second configuration information in another manner. For example, the access network device and the terminal device determine the second configuration information based on a preset setting.

Optionally, steps 710 and 720 may be one step. For example, the first configuration information and the second configuration information may be sent by using one piece of signaling. Alternatively, steps 710 and 720 may be two steps. For example, the first configuration information and the second configuration information may be separately sent by using two pieces of signaling.

The M PUCCH resources may be, for example, M multi-CSI PUCCH resources. The multi-CSI PUCCH resources are used to: when the terminal device needs to send, within a time unit, L pieces of CSI whose resources collide, one of the M multi-CSI PUCCH resources is used to carry L' pieces of CSI in the L pieces of CSI, where $L \geq L' \geq 1$, L and L' are positive integers, and L is not 1.

Optionally, the M multi-CSI PUCCH resources may alternatively have other names, for example, multi-UCI PUCCHs. The multi-UCI PUCCH resource is used to: when the terminal device needs to send, in a time unit, L pieces of UCI whose resources collide, one of the M multi-UCI PUCCH resources is used to carry L' pieces of UCI in the L pieces of UCI, where $L \geq L' \geq 1$, L and L' are positive integers, and L is not 1. The L pieces of UCI may be UCI of a same type, or may be UCI of different types. For example, a part of the UCI is ACK/NACK information, and a part of the UCI is CSI information.

The actions in this step may be implemented by the transceiver 401 of the terminal device 204. Certainly, the actions may alternatively be implemented by the modem processor 404 and the transceiver 401 that are of the terminal device 204. The actions in this step may be implemented by the transceiver 302 of the access network device 202. Certainly, the actions may alternatively be implemented by the processor 301 and the transceiver 302 that are of the access network device 202.

Step 720a: The access network device sends third configuration information to the terminal device, and the terminal device receives the third configuration information.

This step is an optional step and is not shown in the figure. The access network device and the terminal device may alternatively determine the third configuration information in another manner. For example, the access network device and the terminal device determine the third configuration information based on a preset setting.

The third configuration information is used to indicate X PUCCH resources. The X PUCCH resources may be, for example, in X PUCCH resource sets $S_1, \ldots,$ and $S_X$. Each PUCCH resource set includes one or more PUCCH resources. A quantity of bits that are of the UCI and that are supported by an $i^{th}$ PUCCH set ranges from $L_{i,1}$ to $L_{i,2}$, and $L_{i,1} = L_{i-1, 2}$, $i=1, \ldots,$ or X. UCI carried on the X PUCCH resource sets includes ACK/NACK information.

It should be noted that the first configuration information, the second configuration information, and the third configuration information may be separately sent by using three pieces of signaling or two pieces of signaling, and certainly, may alternatively be sent by using one piece of signaling.

Step 730: The terminal device and the network device separately determine that at least two PUCCH resources collide in a time unit n.

It should be noted that the terminal device and the network device may simultaneously determine that the at least two PUCCH resources collide in the time unit n, or may determine, at different time, that the at least two PUCCH resources collide in the time unit n. This is not limited in this embodiment of the present invention.

Further, in this embodiment of the present invention, there may be a plurality of options for defining PUCCH collision.

For example, when UCI corresponding to $N \geq 2$ PUCCH resources needs to be sent in the time unit n, it may be considered that PUCCH resources collide. In this case, when N=2 and all the M PUCCH resources are resources corresponding to a long PUCCH, regardless of whether the two PUCCH resources include a same OFDM symbol, it is considered that the two PUCCH resources collide.

For another example, when UCI corresponding to N=2 PUCCH resources needs to be sent in the time unit n, and the two PUCCH resources occupy at least one same OFDM symbol, the two PUCCH resources collide. If the two PUCCH resources do not occupy a same OFDM symbol, it is considered that the two PUCCH resources do not collide.

For another example, when N≥3, it may be considered that the N PUCCH resources collide as long as UCI corresponding to the N PUCCH resources needs to be sent in the time unit n. When N=2, whether the PUCCH resources collide is determined based on a situation whether at least one same OFDM symbol is occupied.

That the terminal device and the network device determine that the time unit n includes at least three PUCCH resources includes:

determining, by the terminal device or the network device based on information about configuration for periodic CSI reporting (for example, the information may include information about a used PUCCH resource, and a period and a time unit offset for the periodic CSI reporting), whether periodic CSI that needs to be sent exists in the time unit n, and determining a PUCCH resource configured for the periodic CSI that needs to be sent; and determining, by the terminal device or the network device, whether an ACKNACK that needs to be sent exists in the time unit n, and determining a PUCCH resource configured for the ACK/ACK that needs to be sent.

In addition, the terminal device or the network device may further determine, based on resource configuration information of an SR and a period and a time unit offset for SR reporting, whether an SR that needs to be sent exists in the time unit n and determining a PUCCH resource configured for the SR that needs to be sent.

According to the foregoing process, a PUCCH resource that originally needs to be sent and that is in the time unit n can be determined. In this way, a quantity of PUCCH resources included in the time unit n is determined.

The configuration information may be the first configuration information sent in step 710 and/or the third configuration information sent in step 720*a*.

The action in this step may be implemented by the modem processor 404 of the terminal device 204. The action in this step may be performed by the processor 301 of the access network device 202.

Step 740: The terminal device and the network device respectively determine a first resource and a third resource in the time unit n.

In a first optional implementation, the determining a first resource in the time unit n includes: determining that the at least two PUCCH resources include one resource at least configured for HARQ-ACK information, and determining the resource as the first resource, where the first UCI includes the HARQ-ACK information. That is, if UCI carried in one of the at least two PUCCH resources includes the HARQ-ACK information, the terminal device determines the resource as the first resource.

In the first optional implementation, as described above, a manner of determining the resource may be, for example, determining a set $S_j$ from the X PUCCH resource sets $S_1, \ldots,$ and $S_X$ based on a total quantity of bits of the first UCI that needs to be sent in a time unit i; and determining a PUCCH resource x in the set $S_j$, where the PUCCH resource x is the first resource. For example, the terminal device determines the PUCCH resource x in the set $S_j$ based on DC. The access network device determines the PUCCH resource x based on the configuration information.

The M PUCCH resource sets are indicated by the second configuration information in step 720.

In this optional implementation, the HARQ-ACK information is transmitted by using the original PUCCH resource as much as possible, thereby reducing impact caused by collision between the HARQ-ACK information and the CSI on resource selection for HARQ-ACK information, and ensuring transmission performance of the HARQ-ACK information.

In a second optional implementation, the determining a first resources includes:

determining that the at least two PUCCH resources include one resource configured for first CSI and one resource configured for second CSI, where the first resource is the resource configured for the first CSI, the first UCI includes the first CSI, and the second UCI includes the second CSI.

It should be noted that the resource at least configured for the HARQ-ACK information may be further configured to carry an SR.

In the second optional implementation, the at least two PUCCH resources may further include one resource at least configured for the HARQ-ACK information, and the second UCI further includes the HARQ-ACK information.

Optionally, a transmission parameter of the first CSI is greater than a transmission parameter of the second CSI, where the transmission parameter includes one or more of a quantity of reference bits before encoding, a quantity of reference bits after encoding, a priority of CSI, and a configuration index of the CSI.

Alternatively, a resource parameter of the PUCCH resource configured for the first CSI is greater than a resource parameter of the PUCCH resource configured for the second CSI, where the resource parameter includes one or more of a quantity of RBs occupied by the PUCCH resource, a quantity of REs occupied by the PUCCH resource, a quantity of OFDM symbols occupied by the PUCCH resource, and a maximum quantity of bits that can be carried on the PUCCH resource.

For example, in the second optional implementation, the determining a first resource includes: determining a PUCCH resource that corresponds to CSI with the largest transmission parameter and that is in the at least two PUCCH resources as the first resource. In this implementation of the present invention, if allowed, a PUCCH resource that occupies a maximum quantity of resources is still used, so that a waste of PUCCHs caused by CSI collision can be reduced.

The quantity of reference bits of the UCI may be an actual quantity of bits of the UCI, or under a specific condition, may be a maximum quantity of bits of the UCI, or may be a quantity of bits of the UCI at a specific value of a parameter. For example, if the UCI is CSI, a quantity of reference bits of the CSI may be a maximum quantity of bits of the CSI at all values of a CRI/RI, or a quantity of reference bits of the CSI is a quantity of bits of the CSI at a predefined value of a CRI/RI, or a maximum quantity of bits of the CSI within a value range of another measurement parameter. The quantity of reference bits of the CSI may have other forms.

Optionally, a transmission parameter of the first CSI is greater than a transmission parameter of the second CSI, where the transmission parameter is determined based on one or more of a quantity of reference bits before encoding, a quantity of reference bits after encoding, a priority of the CSI, and a configuration index of the CSI. Alternatively, a resource parameter of the resource carrying the first CSI is greater than a resource parameter of the resource carrying the second CSI, where the resource parameter is determined based on one or more of a quantity of RBs occupied by the PUCCH resource, a quantity of REs occupied by the PUCCH resource, a quantity of OFDM symbols occupied by the PUCCH resource, and a maximum quantity of bits carried on the PUCCH resource.

Optionally, a transmission parameter of the first CSI is less than a transmission parameter of the second CSI, where the transmission parameter includes one or more of a quantity of reference bits before encoding, a quantity of reference bits after encoding, a priority of the CSI, and a configuration index of the CSI. Alternatively, a resource parameter of the resource carrying the first CSI is less than a resource parameter of the resource carrying the second CSI, where the resource parameter includes one or more of a quantity of RBs occupied by the PUCCH resource, a quantity of REs occupied by the PUCCH resource, a quantity of OFDM symbols occupied by the PUCCH resource, and a maximum quantity of bits carried on the PUCCH resource.

Optionally, a transmission parameter of the first CSI is less than a transmission parameter of the second CSI, where the transmission parameter is determined based on one or more of a quantity of reference bits before encoding, a quantity of reference bits after encoding, a priority of the CSI, and a configuration index of the CSI. Alternatively, a resource parameter of the resource carrying the first CSI is less than a resource parameter of the resource carrying the second CSI, where the resource parameter is determined based on one or more of a quantity of RBs occupied by the PUCCH resource, a quantity of REs occupied by the PUCCH resource, a quantity of OFDM symbols occupied by the PUCCH resource, and a maximum quantity of bits carried on the PUCCH resource.

For example, in the second optional implementation, the determining a first resource includes: determining a PUCCH resource that corresponds to CSI with the smallest transmission parameter and that is in the at least two PUCCH resources as the first resource.

It should be noted that the resource carrying the second UCI in this embodiment of the present invention is not necessarily actually used to send the UCI. The resource carrying the second UCI may be a resource originally configured for the UCI, but is not actually used. Instead, the third resource is used to send the UCI.

Further, in an optional implementation, the determining a third resource in a time unit n includes: determining, as the third resource, a resource that is in the M PUCCH resources and that does not include a same OFDM symbol with the first resource in time domain. For example, when only one of the M PUCCH resources does not include a same OFDM symbol with the first resource in time domain, the PUCCH resource is the third resource.

In another optional implementation, the determining a third resource in a time unit n includes the following steps.

Step 7401a: Determine M3 PUCCH resources that are in the M PUCCH resources and that do not include a same OFDM symbol with the first resource in time domain, where M3 is a positive integer greater than 1.

Step 7402a: Determine M1 PUCCH resources in the M3 PUCCH resources, where a maximum quantity of bits that can be carried on each of the M1 PUCCH resources is greater than or equal to a sum of a quantity of all bits of the second UCI and a quantity of CRC bits.

Optionally, the M1 PUCCH resources satisfy:

$$\left(\sum_{i \in \Lambda} O_{UCI-i} + O_{CRC}\right) \leq M_{RB} N_{sc} N_{symb} Q_m r_{max}$$

$M_{RB}$ is a quantity of RBs occupied by the PUCCH resource in frequency domain, $N_{sc}$ is a quantity of subcarriers included in each RB, $N_{symb}$ is a quantity of OFDM symbols occupied by the PUCCH resource in time domain. $Q_m$ is a modulation order used by the CSI on the PUCCH resource during transmission, and $r_{max}$ is a maximum channel coding code rate that can be allowed by the PUCCH resource. The parameters may be configured by a base station for each multi-CSI PUCCH resource, for example, included in the second configuration information. $O_{UCI-i}$ is a quantity of reference bits of $i^{th}$ UCI, $i \in \Lambda$ indicates that the $i^{th}$ UCI belongs to the second UCI, and $O_{CRC}$ is a quantity of bits of the CRC.

When M1=1, the M1 PUCCH resource is the third resource, and step 7403a is not performed. When M1 is greater than 1, step 7403a is also performed.

Step 7403a: Determine a PUCCH resource that occupies a smallest quantity of REs or RBs and that is in the M1 PUCCH resources, as the third resource.

In still another optional implementation, the determining a third resource in a time unit n includes the following steps.

Step 7401b: Determine M2 PUCCH resources that are in the M PUCCH resources and that do not include a same OFDM symbol with the first resource in time domain, where M2 is a positive integer.

Step 7402b: Determine that a resource on which a maximum quantity of bits that can be carried is greater than or equal to a sum of a quantity of all bits of the second UCI and a quantity of CRC bits does not exist in the M2 PUCCH resources.

Step 7403b: Determine, as the third resource, a resource in the M2 PUCCH resources that meets the following condition:

a PUCCH resource that occupies a largest quantity of REs and that is in the M2 PUCCH resources;

a PUCCH resource that occupies a largest quantity of RBs and that is in the M2 PUCCH resources; or a PUCCH resource that can carry a largest maximum quantity of bits and that is in the M2 PUCCH resources.

In yet another optional implementation, the determining a third resource in a time unit n includes the following steps.

Step 7401c: Determine a resource that is in the M PUCCH resources and that does not include a same OFDM symbol with the first resource in time domain, when only one of the M PUCCH resources does not include a same OFDM symbol with the first resource in time domain, the PUCCH resource is the third resource. If M3 PUCCH resources in the M PUCCH resources do not include a same OFDM symbol with the first resource in time domain, step 7402c is performed, where M3 is an integer greater than 1.

Step 7402c: Determine whether a resource on which a maximum quantity of bits that can be carried is greater than or equal to a sum of a quantity of all bits of the second UCI and a quantity of CRC bits exists in the M3 PUCCH resources. If M1 PUCCH resources satisfy the condition, when M1=1, the M1 PUCCH resource is the third resource, and step 750 is performed. When M1 is greater than 1, step 7403c is performed. When no resource satisfying the condition exists, step 7404d is performed.

Step 7403c: Determine a PUCCH resource that occupies a smallest quantity of REs or RBs and that is in the M PUCCH resources, as the third resource, and perform step 750.

Step 7404*b*: Determine, as the third resource, a resource in the M3 PUCCH resources that meets the following condition:

a PUCCH resource that occupies a largest quantity of REs and that is in the M3 PUCCH resources;

a PUCCH resource that occupies a largest quantity of RBs and that is in the M3 PUCCH resources; or a PUCCH resource that can carry a largest maximum quantity of bits and that is in the M3 PUCCH resources.

The action in this step may be implemented by the modem processor 404 of the terminal device 204. The action in this step may be performed by the processor 301 of the access network device 202.

It should be noted that if no third resource that meets the foregoing condition can be found according to the foregoing method, for example, all the M PUCCH resources include a resource of a same OFDM symbol with the first resource in time domain, only a fourth resource is determined in step 740, and the first resource is not used.

In an optional implementation, for example, when the first UCI includes the first CSI, and the second UCI includes the second CSI, a method for determining the fourth resource may include: determining the fourth resource from the M multi-CSI PUCCH resources (namely, the M PUCCH resources described above) corresponding to the second configuration information, where the fourth resource is a PUCCH resource that occupies the smallest quantity of REs (or the smallest quantity of RBs or can occupy the smallest maximum quantity of bits) and that is in the M multi-CSI PUCCH resources, and the PUCCH resource can carry the first UCI and the second UCI at an actual bit rate that does not exceed a maximum coding code rate. That is, both the first UCI and the second UCI are sent on the fourth resource. If the M multi-CSI PUCCHs do not include a PUCCH resource that can carry all the first UCI and the second UCI, a PUCCH resource with a largest quantity of RBs is selected, and N2<N pieces of UCI is selected according to a predefined rule, to be carried on the PUCCH resource. Certainly, this optional implementation is not limited to the foregoing case.

In another optional implementation, for example, when the first UCI includes HARQ-ACK information, and the second UCI includes CSI, a method for determining the fourth resource may include: determining one resource set j in X PUCCH resource sets based on a quantity of bits of N1 ACK/NACKs and a quantity of reference bits of N2 pieces of CSI (or based on a total quantity of bits of all the N pieces of second UCI), and selecting the fourth resource from the set j based on indication information of DCI corresponding to the N1 ACK/NACKs. The fourth resource is used to carry all the ACK/NACKs, N4≤N2 pieces of CSI, and all or a part of other UCI. A manner for determining N4 is determined by a maximum code rate of the fourth resource. This is similar to the foregoing implementation, and details are not described herein again.

Step 750: The terminal device sends a part or all of the first UCI on the first resource in the time unit n, and sends a part or all of the second UCI on the third resource in the time unit n.

Certainly, if no third resource meets the condition, the terminal device sends a part or all of the first UCI and a part or all of the second UCI on the fourth resource in the time unit n.

Further, when a part of the first UCI is sent, a part of the first UCI to be sent or to be discarded may be selected according to a predefined rule. For example, based on priorities of different parameters in the UCI, a parameter with a lower priority is first discarded, until the first resource can use a code rate that does not exceed the maximum coding code rate to carry a parameter that is not discarded. This is also the same as selecting a part of the second UCI to be sent.

The actions in this step may be implemented by the transceiver 401 of the terminal device 204. Certainly, the actions may alternatively be implemented by the modem processor 404 and the transceiver 401 that are of the terminal device 204.

Step 760: The access network device receives a part or all of the first UCI on the first resource in the time unit n, and receives a part or all of the second UCI on the third resource in the time unit n.

Certainly, if no third resource meets the condition, the access network device receives a part or all of the first UCI and a part or all of the second UCI on the fourth resource in the time unit n.

The actions in this step may be implemented by the transceiver 302 of the access network device 202. Certainly, the actions may alternatively be implemented by the processor 301 and the transceiver 302 that are of the access network device 202.

It should be noted that a sequence of the foregoing steps is not limited in this embodiment of the present invention, and the sequence numbers of the steps are not used to limit the sequence of the steps in this embodiment of the present invention. For example, a sequence of step 710 and step 720 may be interchanged.

An example of the present invention further provides an apparatus (for example, an IC, a wireless device, or a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a handheld phone, or a mobile unit, or (vii) others.

The method and apparatus that are provided in the embodiments of the present invention may be applied to a terminal device or an access network device (which may be collectively referred to as a wireless device). The terminal device, the access network device, or the wireless device may include a hardware layer, an operating system layer running on the hardware layer, and an application layer running on the operating system layer. The hardware layer includes hardware such as a CPU, a memory management unit (MMU), and a memory (also referred to as a main memory). The operating system may be any one or more types of computer operating systems, for example, a Linux operating system, a Unix operating system, an Android operating system, an iOS operating system, or a windows operating system, that process a service by using a process. The application layer includes applications such as a browser, an address book, word processing software, and instant messaging software. In addition, a specific structure of an execution body of the method is not limited in the embodiments of the present invention, provided that the execution body can perform communication based on the signal transmission method in the embodiments of the present invention by running a program that records code of the method in the embodiments of the present invention. For example, the wireless communication method in the embodiments of the present invention may be performed by the terminal device or the access network device, or a functional module that is in the terminal device or the access network device and that can invoke and execute a program.

A person of ordinary skill in the art may be aware that in combination with units and algorithm steps of the examples described in the embodiments disclosed in this specification, this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or the functions according to the embodiments of the present invention are completely or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or the communication connections between apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

When the functions are implemented in the form of a software functional unit and sold or used as an independent product, the functions may be stored in a computer-readable storage medium. Based on such an understanding, the technical solutions in the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the method described in the embodiments of the present invention. The foregoing storage medium includes: any medium that can store program code, such as a USB flash drive, a removable hard disk, a read-only memory (ROM), a random access memory (RAM), a magnetic disk, and an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A resource determining method, comprising:
   determining that at least two physical uplink control channel (PUCCH) resources collide in a time unit n, wherein n is an integer, and wherein the at least two PUCCH resources comprise a first resource configured for first uplink control information (UCI) and a second resource configured for second UCI; and determining the first resource and a third resource in the time unit n, wherein the third resource is one of M1 PUCCH resources, wherein the first resource is used to carry third UCI, wherein the third UCI is a part or all of the first UCI, wherein the third resource is used to carry fourth UCI, and wherein the fourth UCI is a part or all of the second UCI, wherein determining the third resource comprises:

determining the M1 PUCCH resources, wherein none of the M1 PUCCH resources comprises a same orthogonal frequency division multiplexing (OFDM) symbol as the first resource in time domain, wherein M1 is an integer greater than or equal to 2; and determining, as the third resource, a resource that occupies a minimum quantity of resource elements (REs) or resource blocks (RBs) among the M1 PUCCH resources.

2. The method according to claim 1, further comprising: sending the third UCI and the fourth UCI in the time unit n, wherein the third UCI is carried on the first resource, and wherein the fourth UCI is carried on the third resource.

3. The method according to claim 1, further comprising: receiving the third UCI and the fourth UCI in the time unit n, wherein the third UCI is carried on the first resource, and wherein the fourth UCI is carried on the third resource.

4. The method according to claim 1, wherein a quantity of OFDM symbols occupied by at least one of the third resource or the first resource in time domain is less than or equal to 2.

5. The method according to claim 1, wherein a quantity of OFDM symbols occupied by one of the third resource and the first resource in time domain is greater than 2.

6. The method according to claim 1, wherein each of the M1 PUCCH resources has an available quantity of bits that is greater than or equal to a sum of a quantity of all bits of the second UCI and a quantity of cyclic redundancy check bits.

7. The method according to claim 1, wherein: the third resource is at least one of:
a PUCCH resource that occupies the largest quantity of REs and that is in M2 PUCCH resources;
a PUCCH resource that occupies the largest quantity of RBs and that is in M2 PUCCH resources; or
a PUCCH resource that carries the largest maximum quantity of bits and that is in M2 PUCCH resources; and
each of the M2 PUCCH resources and the first resource do not comprise a same OFDM symbol in time domain, and wherein M2 is a positive integer.

8. The method according to claim 1, wherein determining that the at least two PUCCH resources collide comprises at least one of:
determining that the time unit n comprises at least three PUCCH resources;
determining that the time unit n comprises two PUCCH resources, and quantities of OFDM symbols occupied by the two PUCCH resources are both greater than or equal to 4; or
determining that the time unit n comprises two PUCCH resources, and that the two PUCCH resources occupy at least one same OFDM symbol.

9. The method according to claim 1, wherein:
a type of the first UCI is different from a type of the second UCI;
the type of the first UCI comprises one or more of hybrid automatic repeat request-acknowledgment (HARQ-ACK) information, channel state information (CSI), or a scheduling request (SR); and
the type of the second UCI comprises one or more of HARQ-ACK information, CSI, or a SR.

10. The method according to claim 1, wherein determining the first resource comprises:
determining that the at least two PUCCH resources comprise a particular resource at least configured for HARQ-ACK information, wherein the first resource is the particular resource, and wherein the first UCI comprises the HARQ-ACK information.

11. A wireless apparatus, comprising:
at least one processor; and
a memory coupled to the at least one processor and storing programming instructions for execution by the at least one processor, wherein the programming instructions instruct the at least one processor to:
determine that at least two physical uplink control channel (PUCCH) resources collide in a time unit n, wherein n is an integer, and wherein the at least two PUCCH resources comprise a first resource configured for first uplink control information (UCI) and a second resource configured for second UCI; and
determine the first resource and a third resource in the time unit n, wherein the third resource is one of M1 PUCCH resources, wherein the first resource is used to carry third UCI, wherein the third UCI is a part or all of the first UCI, wherein the third resource is used to carry fourth UCI, and wherein the fourth UCI is a part or all of the second UCI, wherein determining the third resource comprises:
determining the M1 PUCCH resources, wherein none of the M1 PUCCH resources comprises a same orthogonal frequency division multiplexing (OFDM) symbol as the first resource in time domain, wherein M1 is an integer greater than or equal to 2; and
determining, as the third resource, a resource that occupies a minimum quantity of resource elements (REs) or resource blocks (RBs) among the M1 PUCCH resources.

12. The apparatus according to claim 11, wherein the programming instructions instruct the at least one processor to:
send the third UCI and the fourth UCI in the time unit n, wherein the third UCI is carried on the first resource, and wherein the fourth UCI is carried on the third resource.

13. The apparatus according to claim 11, wherein the programming instructions instruct the at least one processor to:
receive the third UCI and the fourth UCI in the time unit n, wherein the third UCI is carried on the first resource, and wherein the fourth UCI is carried on the third resource.

14. The apparatus according to claim 11, wherein a quantity of OFDM symbols occupied by at least one of the third resource or the first resource in time domain is less than or equal to 2.

15. The apparatus according to claim 11, wherein a quantity of OFDM symbols occupied by one of the third resource and the first resource in time domain is greater than 2.

16. The apparatus according to claim 11, wherein each of the M1 PUCCH resources has an available quantity of bits that is greater than or equal to a sum of a quantity of all bits of the second UCI and a quantity of cyclic redundancy check bits.

17. The apparatus according to claim 11, wherein: the third resource is at least one of:
   a PUCCH resource that occupies the largest quantity of REs and that is in M2 PUCCH resources;
   a PUCCH resource that occupies the largest quantity of RBs and that is in M2 PUCCH resources; or
   a PUCCH resource that carries the largest maximum quantity of bits and that is in M2 PUCCH resources; and
   each of the M2 PUCCH resources and the first resource do not comprise a same OFDM symbol in time domain, and wherein M2 is a positive integer.

18. The apparatus according to claim 11, wherein determining that the at least two PUCCH resources collide comprises at least one of:
   determining that the time unit n comprises at least three PUCCH resources;
   determining that the time unit n comprises two PUCCH resources, and quantities of OFDM symbols occupied by the two PUCCH resources are both greater than or equal to 4; or
   determining that the time unit n comprises two PUCCH resources, and that the two PUCCH resources occupy at least one same OFDM symbol.

19. The apparatus according to claim 11, wherein:
   a type of the first UCI is different from a type of the second UCI;
   the type of the first UCI comprises one or more of hybrid automatic repeat request-acknowledgment (HARQ-ACK) information, channel state information (CSI), or a scheduling request (SR); and
   the type of the second UCI comprises one or more of HARQ-ACK information, CSI, or a SR.

20. The apparatus according to claim 11, wherein determining the first resource comprises:
   determining that the at least two PUCCH resources comprise a particular resource at least configured for HARQ-ACK information, wherein the first resource is the particular resource, and wherein the first UCI comprises the HARQ-ACK information.

* * * * *